Jan. 23, 1962 W. G. MIR ET AL 3,018,101
OCCUPANT PROPELLED MERRY-GO-ROUND
Filed Nov. 10, 1959 2 Sheets-Sheet 2
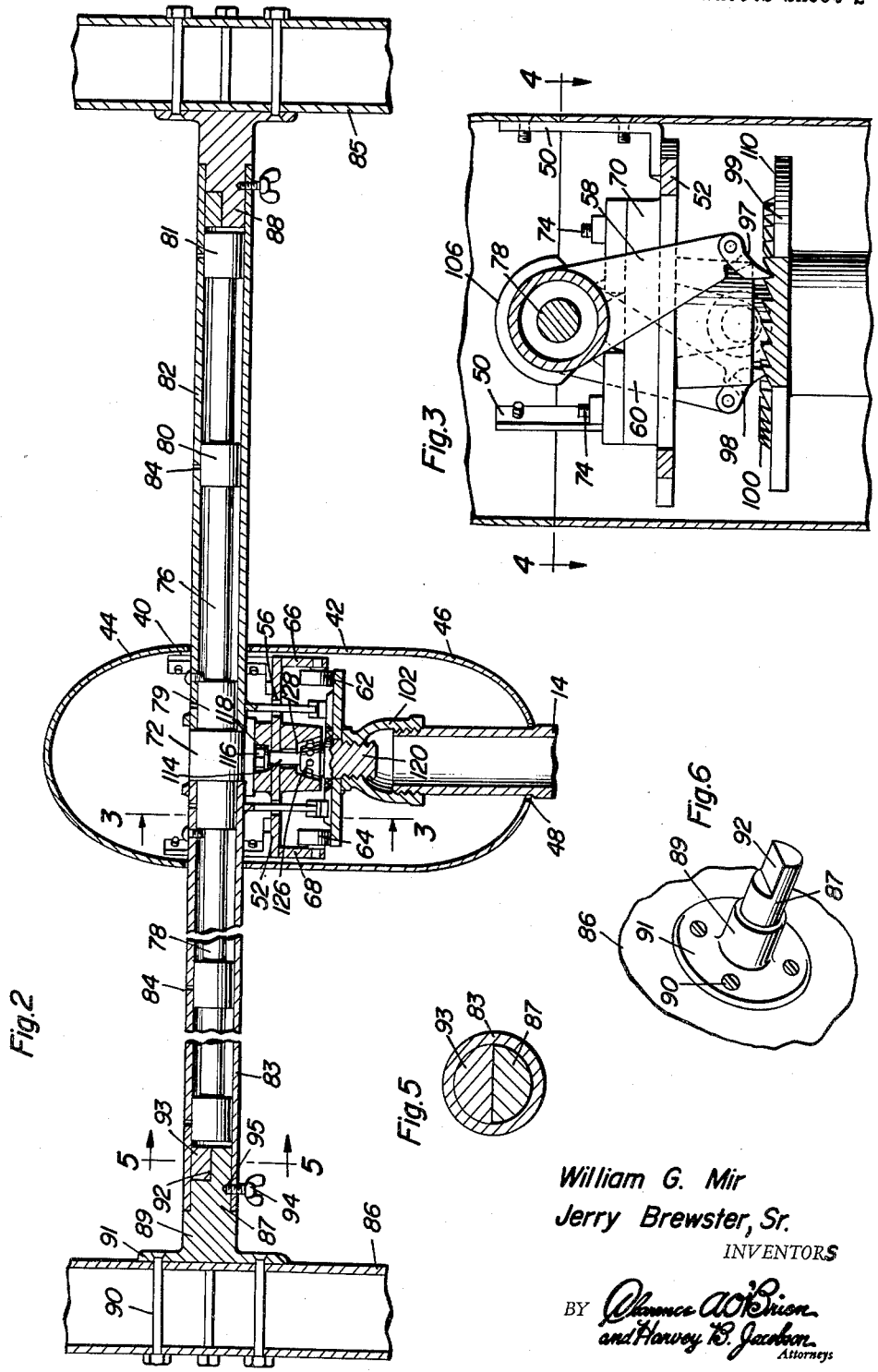
William G. Mir
Jerry Brewster, Sr.
INVENTORS United States Patent Office 3,018,101
Patented Jan. 23, 1962

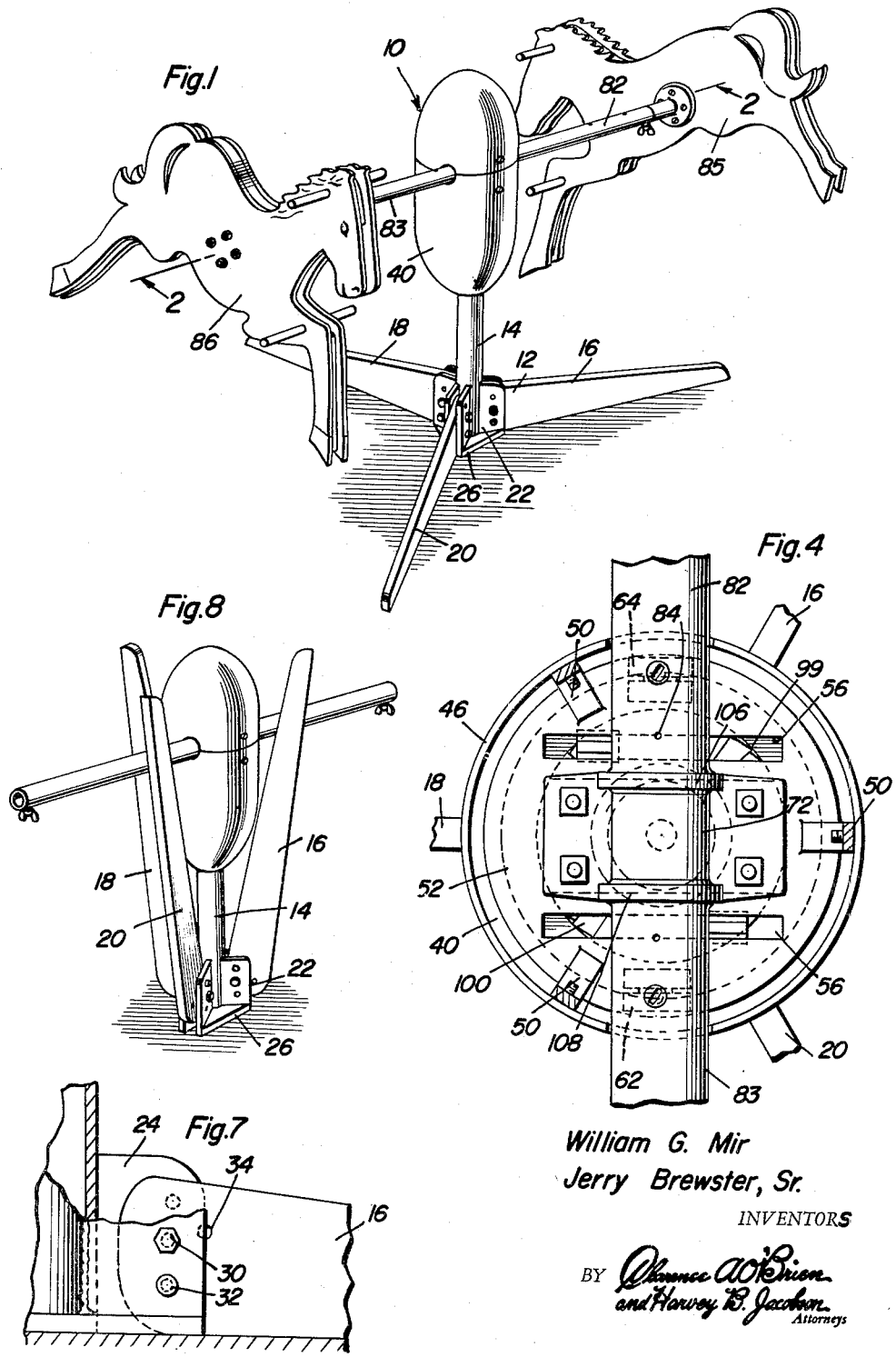

3,018,101
OCCUPANT PROPELLED MERRY-GO-ROUND
William G. Mir, Box 328, Wendover, Utah, and Jerry Brewster, Sr., 231 W. 1st S., Brigham City, Utah
Filed Nov. 10, 1959, Ser. No. 852,027
10 Claims. (Cl. 272—33)

This invention relates to amusement devices and more particularly to an occupant propelled merry-go-round.

Briefly, an embodiment of the invention is constructed of a post on which a rotor is mounted. The rotor has bearings supporting torque tubes at one end of which occupant supports are coupled. Means, preferably including ratchets and a ratchet wheel, are operatively connected between the inner ends of the torque tubes and the stationary post to cause propulsion of the rotor in response to oscillatory movement of the torque tubes. In this way the occupants, ordinarily small children, are capable of rocking the supports back and forth and causing an oscillatory motion to be imparted to the torque tubes. This, in turn, directly results in the entire rotor including the torque tubes and occupant supports, being rotated about the longitudinal axis of the post.

Accordingly, an object of the invention is to provide an amusement device of the type briefly discussed above by which children may be amused for long periods of time.

An important feature of the invention is found in the base. It is foldable to a collapsed position for storage, shipment, etc., and capable of being opened to form a very steady base for the post.

Another important feature of the invention is in the arrangement of torque tubes and bearings for the torque tubes, together with the separable coupling of the supports at the ends of the torque tubes, whereby the supports may be removed for any reason, it being contemplated to provide a variety of different figurines e.g. ponies and horses, to function as occupant supports.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the occupant propelled amusement device in accordance with the invention.

FIGURE 2 is an enlarged sectional view taken on the line 2—2 of FIGURE 1.

FIGURE 3 is an enlarged transverse sectional view taken on the line 3—3 of FIGURE 2.

FIGURE 4 is a sectional view taken on the line 4—4 of FIGURE 3.

FIGURE 5 is a sectional view taken on the line 5—5 of FIGURE 2.

FIGURE 6 is a perspective view showing a part of the coupling for connecting one of the occupant supports to one of the torque tubes.

FIGURE 7 is an enlarged fragmentary elevational view, parts being broken away in section, to show the construction of the base.

FIGURE 8 is a perspective view of the base in the collapsed position and with the occupant supports removed.

In the accompanying drawings amusement device 10 is illustrated to exemplify the principles of the invention. The device (FIGURE 1) is an occupant propelled merry-go-round and has a base 12 together with a post 14 which is vertical when in the operative position. The post may be made of pipe or other suitable structural member, while base 12 is made of three arms 16, 18 and 20 protruding radially outwardly from a special bracket 22. The bracket has three pockets made of pairs of plates 24 attached to a base plate 26. The inner ends of the three arms are fitted in their individual pockets and are adapted to swing on a pivot, for instance pivot 30 for arm 16 in FIGURE 7. An additional locking bolt 32 may be used, and there are additional holes 34 in the inner end of arm 16 whereby the arm may be swung to an upward position (FIGURE 8) and bolt 32 used to hold it in that position. When in the down position, the bolts are attached in place and this forms a very substantial base capable of being folded to a compact position.

Rotor 40 is mounted at the top end of post 14 and is made of a number of parts. The rotor has a housing 42 made up of an upper member 44 and a lower member 46 provided with an aperture 48 through which post 14 loosely passes (FIGURE 2). The two housing sections are connected together by clamps or brackets 50 (FIGURE 3) attached to each housing section, for instance by screws. Rotary plate 52 is welded or otherwise secured to the lower ends of brackets 50 (FIGURE 3) and it has slots 56 therein through which ratchet arms 58 and 60 extend. These ratchet arms will be described in more detail subsequently. Support wheels 62 and 64 are mounted for rotation on spindles that are carried by hangers 66 and 68, the latter being secured rigidly to the lower surface of plate 52 and depending therefrom. Block 70 is fixed to the top surface of plate 52 and has a bearing clamp 72 secured thereto, for instance by bolts 74.

Bearing clamp 72 is used to secure bearings 76 and 78 to the block 70 and consequently plate 52. Each bearing 76 and 78 is identical, the bearings being each equipped with a plurality of bearing members, for instance bearing members 79, 80 and 81 for bearing 76. The bearing members are cylindrical and provide spaced bearing surfaces for torque tube 82. Torque tube 83 is similarly mounted on bearing 78, and there are a plurality of oil holes 84 at properly spaced places in torque tubes 82 and 83 to admit lubricant to the bearing members. The bearing members and torque tubes are coaxial and protrude radially outwardly from the center part of the rotor.

Occupant supports, for instance figurines of any type such as the disclosed horses or ponies are separably attached to the outer ends of the torque tubes. Occupant support 85 is secured to torque tube 82 and occupant support 86 is secured to torque tube 83 at the respective outer ends of each. It is preferred that the occupant supports be separably coupled to the torque tubes and for the structure of couplings 87 and 88, reference is made principally to FIGURES 2, 5 and 6. Both couplings are identical. Spindle 89 is fixed to support 85 by means of bolts 90 attached to the support 86 and to flange 91 which is integral or otherwise fixed to spindle 89. There is a notch 92 at the outer extremity of spindle 89 and this notch is engageable with block 93 that is fixed within torque tube 83 near the outer end thereof. Set screw 94 is carried by the torque tube and upon tightening the setscrew it penetrates a small opening 95 in spindle 89 thereby assuring a firm connection between torque tube 83 and occupant support 86.

There are means connected between the torque tubes and the post for propelling the rotor. These means consist of the previously mentioned arms 58 and 60, each of which has its ratchet pawl 97 and 98 pivoted to the lower extremity thereof. A ratchet wheel 99 having ratchet teeth 100 formed in a circle on one face thereof, is rigidly fixed to the upper end of post 14. The connection may be made by coupling 102 (FIGURE 2) threaded on the upper end of the post 14 and welded to the lower surface of the ratchet wheel 99. The arms 58 and 60 are welded or otherwise secured to the two individually oscillatable torque tubes, and there are stops 106 and 108 in the form of circumferential rib segments fixed to the torque tubes and adapted to abut the upper part of the rotor to limit the extent of oscillatory movement in both directions of each of the torque tubes. A raceway 110 is formed by the peripheral part of the upper surface of ratchet wheel 99, and wheels 62 and 64 are mounted thereon thereby providing mechanical support for the rotor.

Center spindle 114 has a nut 116 at the upper end located in a recess 118 formed in block 70. This spindle has an enlarged threaded part 120 at its lower end which is threadedly engaged in coupling 102. Thrust bearing 126 is disposed on the spindle between the upper and lower ends thereof, and there is a truncated conical bearing surface 128 formed in the lower part of block 70 which is welded or otherwise secured to the bottom surface of plate 52. The block 70 is considered as having two parts since both of them are welded to the same plate 52, and it is quite evident that the three parts, i.e. two parts of block 70 and plate 52 may be made as a single casting should it be found expedient from a production standpoint.

In operation the occupants rock the supports 85 and 86 causing the torque tubes 82 and 83 to oscillate. With each oscillation the pawls 97 and 98 at the outer ends of arms 58 and 60 establish a driving connection with ratchet seat 100 thereby propelling the rotor in a circular path of travel. This procedure is continued indefinitely.

When it is desired to store or ship the amusement device, the occupant supports 85 and 86 are removed, and the base collapsed (FIGURE 8).

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An occupant propelled merry-go-round comprising a post, a base at the bottom of said post and a thrust bearing connected with said post, a rotor, a pair of elongate bearings secured to said rotor, said rotor mounted for rotation on said thrust bearing, a pair of torque tubes journaled on and enclosing said elongate bearings, occupant supports, means for coupling said occupant supports to said torque tubes by which to rock said torque tubes, and engaged ratchet drive means connected to said post and said torque tubes to rotate said rotor in response to oscillation of said torque tubes.

2. The merry-go-round of claim 1 wherein said elongate bearings are coaxial and extend radially outwardly of said rotor.

3. The merry-go-round of claim 2 wherein there are spaced bearing members on said elongate bearings and which support said torque tubes at spaced places along the length thereof.

4. An occupant propelled merry-go-round comprising a post, a base at the bottom of said post and a thrust bearing connected with said post, a rotor, a pair of elongate bearings secured to said rotor, said rotor mounted for rotation on said thrust bearing, a pair of torque tubes journaled on and enclosing said elongate bearings, occupant supports, means for coupling said occupant supports to said torque tubes by which to rock said torque tubes, engaged ratchet drive means connected to said post and said torque tubes to rotate said rotor in response to oscillation of said torque tubes, and stops comprising circumferentially extending rib segments on the inner end portions of said torque tubes and engageable with said rotor to limit the extent of oscillatory motion of said torque tubes.

5. The merry-go-round of claim 4 wherein said base is foldable to a collapsed position.

6. An occupant propelled merry-go-round comprising an upright post, a rotor, a plate secured to said upright post, means mounting said rotor on said plate and said post whereby the rotor obtains partial support from said plate and said post, ratchet means operatively connected between said rotor and said plate to rotate said rotor, elongated longitudinally aligned bearings fixed on said rotor and extending in opposite directions therefrom, torque tubes journaled on and enclosing said bearings, and means by which to support occupants at the extremities of said torque tubes and oscillate the torque tubes and thereby render effective said means for rotating said rotor.

7. An occupant propelled merry-go-round comprising an upright post, a rotor, a plate secured to said upright post, means mounting said rotor on said plate and said post whereby the rotor obtains partial support from said plate and said post, ratchet means operatively connected between said rotor and said plate to rotate said rotor, elongated longitudinally aligned bearings fixed on said rotor and extending in opposite directions therefrom, torque tubes journaled on and enclosing said bearings, and means by which to support occupants at the extremities of said torque tubes and oscillate the torque tubes and thereby render effective said means for rotating said rotor, said means supporting said rotor including a pair of hangers with wheels thereon, said wheels being supported on said plate, and a spindle carried by said post and on which the rotor is mounted thereby establishing an axis of rotation.

8. The combination of claim 7 wherein there is a thrust bearing connected between said rotor and said spindle.

9. The combination of claim 6 wherein there are bearings protruding laterally from said aligned bearings and on which said torque tubes are mounted for rotation, and said bearings supporting said torque tubes at spaced places along the length of the torque tubes.

10. The amusement device of claim 9 wherein there are stops connected between said rotor and said torque tubes to establish a limit of oscillatory movement of said torque tubes.

References Cited in the file of this patent
UNITED STATES PATENTS

| | | |
|---|---|---|
| 770,121 | Scoggins | Sept. 13, 1904 |
| 1,466,845 | Maxwell | Sept. 4, 1923 |
| 1,486,669 | Kline | Mar. 11, 1924 |
| 2,704,111 | Wunderlich | Mar. 15, 1955 |